(12) United States Patent
Siddoway et al.

(10) Patent No.: US 8,883,238 B2
(45) Date of Patent: Nov. 11, 2014

(54) FRESH FRUIT PRESERVATIVE AND METHOD OF USING SAME

(71) Applicant: PFM, LLC, Rexburg, ID (US)

(72) Inventors: Thane R. Siddoway, Rexburg, ID (US); John Ricks, Idaho Falls, ID (US)

(73) Assignee: PFM, LLC, Rexburg, ID (US)

( * ) Notice: Subject to any disclaimer, the term of this patent is extended or adjusted under 35 U.S.C. 154(b) by 0 days.

(21) Appl. No.: 13/934,045

(22) Filed: Jul. 2, 2013

(65) Prior Publication Data

US 2013/0295248 A1 Nov. 7, 2013

Related U.S. Application Data

(63) Continuation-in-part of application No. 12/860,065, filed on Aug. 20, 2010, now Pat. No. 8,512,781.

(51) Int. Cl.
| | | |
|---|---|---|
| A23L 3/34 | (2006.01) | |
| A23B 7/154 | (2006.01) | |
| A23B 7/157 | (2006.01) | |
| A23L 3/3544 | (2006.01) | |
| A23L 1/212 | (2006.01) | |
| A23L 3/3508 | (2006.01) | |

(52) U.S. Cl.
CPC ............ *A23B 7/154* (2013.01); *A23B 7/157* (2013.01); *A23L 3/3544* (2013.01); *A23L 1/2123* (2013.01); *A23L 3/3508* (2013.01)
USPC ............ 426/321; 426/74; 426/102; 426/335; 426/615

(58) Field of Classification Search
USPC .................... 426/74, 102, 321, 335, 615
See application file for complete search history.

(56) References Cited

U.S. PATENT DOCUMENTS

| | | |
|---|---|---|
| 3,978,235 A | 8/1976 | Schiro |
| 4,336,273 A | 6/1982 | Lee |
| 4,649,057 A | 3/1987 | Thomson |
| 4,818,549 A | 4/1989 | Steiner |
| 4,911,940 A | 3/1990 | Steiner |
| 4,988,523 A | 1/1991 | Gardner |
| 5,126,153 A | 6/1992 | Beck |
| 5,346,712 A | 9/1994 | Cherry |
| 5,840,356 A | 11/1998 | Swensen |
| 5,922,382 A | 7/1999 | Powrie |
| 5,925,395 A | 7/1999 | Chen |
| 5,939,117 A | 8/1999 | Chen |
| 5,945,146 A | 8/1999 | Twinam |
| 6,403,139 B1 | 6/2002 | Sardo |
| 6,749,875 B2 | 6/2004 | Selleck |
| 6,977,090 B2 | 12/2005 | Petcavich |
| 7,931,926 B2 | 4/2011 | Lidster |
| 8,101,221 B2 | 1/2012 | Chen |

FOREIGN PATENT DOCUMENTS

| | | |
|---|---|---|
| CN | 101223910 A | 7/2008 |
| EP | 0859551 | 2/2002 |
| WO | 9412041 | 6/1994 |
| WO | 9723138 | 7/1997 |
| WO | 9907230 | 2/1999 |

OTHER PUBLICATIONS

"Ball Fruit-Fresh Produce Protector", 2012, www.wegmans.com/webapp/wcs/stores/servlet/ProductDisplay?productID+356982&s, pp. 1 and 2.

*Primary Examiner* — Helen F Heggestad

(74) *Attorney, Agent, or Firm* — Morriss O'Bryant Compagni, PC

(57) ABSTRACT

A fresh fruit preservative and method of using the preservative for fresh cut fruit that significantly extend the shelf life of fresh cut fruit are provided. The fresh fruit preservative preserves the texture, flavor, appearance, and color of the fresh fruit, particularly exposed surfaces of the fresh fruit that have been cut, in particular by reducing oxidation of the exposed cut surfaces of the fruit. The preservative includes the ingredients of ascorbic acid, calcium ascorbate, carbohydrate, citric acid, calcium carbonate, sodium chloride, magnesium chloride, potassium bicarbonate, malic acid and a protein-based composition.

27 Claims, No Drawings

FRESH FRUIT PRESERVATIVE AND METHOD OF USING SAME

CROSS-REFERENCE TO RELATED APPLICATION

The present invention claims priority to U.S. patent application Ser. No. 12/860,065 filed on Aug. 20, 2010 to John Ricks, the entirety of which is incorporated by this reference.

BACKGROUND OF THE INVENTION

1. Field of the Invention

The present invention relates generally to preservatives for food and more specifically to a preservative that extends the shelf life of fresh cut fruit by reducing oxidation while preserving texture and flavor.

2. State of the Art

Fresh cut fruit will rapidly deteriorate once the fruit is exposed to air. This is particularly apparent when an apple is cut, and within minutes, the apple slices begin to brown. In addition, the flavor, texture, and crispness rapidly degrade and become significantly less appealing to be eaten. As such, it is often the case that fresh cut fruit is discarded because of its inability to maintain freshness over a relatively short period of time.

Some prior art methods of preserving fruit includes cooking, which changes the flavor, appearance and texture, freezing, which affects the texture and crispness, drying, which changes texture, flavor, crispness and appearance, refrigeration, which can help to preserve crispness and flavor but not appearance, the addition of films, such as wax films which are not desirable to be eaten, and the addition of chemical preservatives, which often significantly and detrimentally change the flavor of the food.

Natural substances such as salt, sugar, vinegar, alcohol, and diatomaceous earth are also used as traditional preservatives. Certain processes such as pickling, smoking and salting can also be used to preserve food but obviously have a significant effect on the flavor. Another group of preservatives targets enzymes in fruits and vegetables that continue to metabolize after they are cut. For instance, citric and ascorbic acids from lemon or other citrus juice can inhibit the action of the enzyme phenolase which turns surfaces of cut apples and potatoes brown. It is known in the art to use citric acid as a food preservative. Citric acid does help delay browning in fruits, but creates a sour taste in the fruit and also allows the fruit to lose its crispness. Sodium ascorbate has also been used to preserve fruit to prevent color degradation for a period of time, but produces a noticeable and unpleasing taste.

Ascorbic acid and its sodium, potassium, and calcium salts are commonly used as antioxidant food additives. These compounds are water-soluble and thus cannot protect fats from oxidation: For this purpose, the fat-soluble esters of ascorbic acid with long-chain fatty acids (ascorbyl palmitate or ascorbyl stearate) can be used as food antioxidants. Calcium ascorbate is a compound with the molecular formula $CaCl_2H_{14}O_{12}$. It is the calcium salt of ascorbic acid, one of the mineral ascorbates. Among its many uses is to keep apples fresh, so they do not turn brown quickly.

U.S. Pat. No. 5,939,117 discloses a method of preserving fresh fruit with fresh fruit preservatives that claim to extend the shelf life of fresh fruit particularly fresh cut fruit. The method includes the steps of providing a solution of fruit preservative comprising water, calcium ions and ascorbate ions, wherein the calcium ions and ascorbate ions are present in a ion ratio of from about 1.5:1 to about 2.5:1, and applying the fruit preservative to the fruit.

U.S. Pat. No. 5,645,880 to McArdle, the entirety of which is incorporated by this reference, relates to a food preserving composition containing an acid and a protein-polysaccharide complex (PPC) composition. The PPC includes a water-soluble polysaccharide, such as Guar gum, a water-insoluble protein such as zein and an acid such as citric acid. The polysaccharide is in an amount of between about 90% to 99% of the total PPC composition. The protein is a prolamine such as zein and is in an amount of between about 10% and 1% of the PPC. The acid is in an amount of between about 0.25% to 5% by weight of the total PPC compositions. The acidulant may be added to the water of an aqueous organic solvent system prior to addition of the organic components although it may be added contemporaneously with other organic components. Zein is extracted from corn or maize. PPC compositions containing zein are used to form odorless, tasteless, clear, hard and nearly invisible films. The PPC composition is sold in the market under the trademark ICEIN. ICEIN is provided in a yellow to white free flowing powder and has a pH of 2.6 to 4.0 in a 1% solution I distilled water at 20 degrees Celsius. The PPC of U.S. Pat. No. 5,645,880 is used to preserve food, specifically seafood and dried fruits and is prepared by dissolving the PPC in an aqueous organic solvent containing alcohol and water in an amount of 100-300 grams of protein per liter of solution.

Among those familiar with the art have used various food preservatives, such as ascorbic acid and its sodium, potassium, and calcium salts to prevent oxidation. In addition, other food preservatives have included ingredients such as calcium, calcium ascorbate, citric acid, sodium acid pyrophosphate (SAPP), calcium chloride and sodium chloride. Each of these prior art preservatives, however, has a detrimental effect on the flavor of the fruit and often have limited effectiveness. Accordingly, it would be advantageous to provide a food preservative composition and method of using the composition to preserve fresh cut fruit that preserves the appearance, color and crispness for a period of days or weeks, and that has either no palatable affect or actually enhances the flavor of the fruit. The present invention provides a food preservative that includes, inter alia, naturally occurring nutrients in the fruit to preserve color, taste, texture and shelf life of fresh cut fruit.

SUMMARY OF THE INVENTION

The present invention pertains to chemical compositions and methods using these compositions for preserving fresh fruit that extend the shelf life of fresh fruit, particularly cut fresh fruit. A fresh fruit preservative according to the present invention preserves the texture, flavor, appearance, crispness, and color of the fresh fruit, particularly the exposed surfaces of fresh cut fruit. In particular, the present invention provides a chemical composition and method of using the chemical composition for the preservation of food, and in particular, fresh cut fruit. The composition can be used alone or in conjunction with other methods of food preservation. The composition includes preservatives that act as antimicrobial preservatives, which inhibit the growth of bacteria and fungi, including mold, and antioxidants, such as oxygen absorbers, which inhibit the oxidation of food constituents.

A method and solution of preserving fresh cut fruit according to the present invention includes a fresh fruit preservative solution comprising water, ascorbic acid, calcium ascorbate, carbohydrate, citric acid, calcium carbonate, sodium chloride, magnesium chloride, potassium bicarbonate, malic acid and a protein-based composition such as a protein-polysaccharide complex, and applying the fresh fruit preservative solution to fresh cut fruit.

In one embodiment the preservative includes ascorbic acid in a percentage by weight of 10% to 92.8%, calcium ascorbate in a percentage by weight of 01% to 67.7%, carbohydrate in a percentage by weight of 0.1% to 85%, citric acid in a percentage by weight of 0.05% to 12%, calcium carbonate in a percentage by weight of 0.05% to 55%, sodium chloride in a percentage by weight of 0.05% to 12%, magnesium chloride in a percentage by weight of 0.01% to 28.3%, potassium bicarbonate in a percentage by weight of 0.005% to 12%, malic acid in a percentage by weight of 0.001% to 22.3%, and a protein-based composition in a percentage by weight of 0.0005% to 12%.

In another embodiment the preservative includes ascorbic acid in a percentage by weight of 55% to 92%, calcium ascorbate in a percentage by weight of 1% to 15%, carbohydrate in a percentage by weight of 1% to 62%, citric acid in a percentage by weight of 0.3% to 22.6%, calcium carbonate in a percentage by weight of 0.3% to 21.6%, sodium chloride in a percentage by weight of 0.3% to 8%, magnesium chloride in a percentage by weight of 0.08% to 6.3%, potassium bicarbonate in a percentage by weight of 0.09% to 7.1%, malic acid in a percentage by weight of 0.01% to 12.9%, and the protein-based composition in a percentage by weight of 0.09% to 7.7%.

In yet another embodiment the preservative includes ascorbic acid in a percentage by weight of 65.9% to 86.8%, calcium ascorbate in a percentage by weight of 1.8% to 12.9%, carbohydrate in a percentage by weight of 1% to 12%, citric acid in a percentage by weight of 3% to 10%, calcium carbonate in a percentage by weight of 1.6% to 11.3%, sodium chloride in a percentage by weight of 0.5% to 4.6%, magnesium chloride in a percentage by weight of 0.1% to 5.3%, potassium bicarbonate in a percentage by weight of 0.5% to 4.6%, malic acid in a percentage by weight of 0.1% to 5.3%, and the protein-based composition in a percentage by weight of 0.8% to 4.6%.

In yet another embodiment the preservative includes ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0%, malic acid in a percentage by weight of approximately 0.6%, and the protein-based composition in a percentage by weight of approximately 0.50%.

In still another embodiment, the preservative comprises calcium chloride. The calcium chloride may be provided in a percentage by weight of 0.01% to 15%.

In another embodiment, the carbohydrate is provided in the form of maltodextrin.

In another embodiment, the preservative includes vitamin E in a percentage by weight of approximately 0.00066%.

In still another embodiment, the preservative includes silicon dioxide.

In yet another embodiment, the protein-based composition is a protein-polysaccharide complex comprised of zein protein, guar gum and an acidulant.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

The present invention pertains to methods of preserving fresh, that is, uncooked, fruit with a fresh fruit preservative, which extends the shelf life of the fresh fruit, particularly freshly cut fruit. The fresh fruit preservative preserves the texture, flavor, appearance, crispness and color of the fruit, such as for example, apples and pears. A method of preserving fresh cut fruit pieces according to the present invention uses a combination of known preservatives, naturally occurring nutrients in fresh fruits and a protein-based composition in the form of a protein-polysaccharide complex (PPC). The PPC may be comprised of zein protein, guar gum and an acidulant.

The method inhibits freshly cut fruit from browning; for example, fruits are prevented from browning for at least one week or more while maintaining the freshness, crispness, texture, color and flavor of the fruit without any residual taste. The exact length of the period of preservation depends upon the initial fruit quality, the species and the variety of the fruit and growing conditions of the fruit. The period of preservation can also be extended by adding refrigeration to the method. The method of the present invention offers the advantage in that the preserved apples may be stored under standard atmospheric pressure and standard atmospheric conditions; that is, the method does not require that the apples be stored under vacuum or inert atmosphere. The method of preserving fruit does not require that the food be cooked, dried or frozen. The method offers the advantage in that it does not require preservatives such as sulfites. However, after the fruit is preserved with the fresh fruit preservative, it may be dried or freeze dried for use as for example food or potpourri; the fresh fruit preservative will further delay the browning that eventually occurs in dried and freeze dried fruits. In the event that such dried or freeze dried fruit is reconstituted, the fruit will be less brown than had the fruit not been preserved with the fresh fruit preservative In one embodiment the preservative includes ascorbic acid in a percentage by weight of 10% to 92.8%, calcium ascorbate in a percentage by weight of 01% to 67.7%, carbohydrate in a percentage by weight of 0.1% to 85%, citric acid in a percentage by weight of 0.05% to 12%, calcium carbonate in a percentage by weight of 0.05% to 55%, sodium chloride in a percentage by weight of 0.05% to 12%, magnesium chloride in a percentage by weight of 0.01% to 28.3%, potassium bicarbonate in a percentage by weight of 0.005% to 12%, malic acid in a percentage by weight of 0.001% to 22.3%, and a protein-based composition in a percentage by weight of 0.0005% to 12%.

In another embodiment the preservative includes ascorbic acid in a percentage by weight of 55% to 92%, calcium ascorbate in a percentage by weight of 1% to 15%, carbohydrate in a percentage by weight of 1% to 62%, citric acid in a percentage by weight of 0.3% to 22.6%, calcium carbonate in a percentage by weight of 0.3% to 21.6%, sodium chloride in a percentage by weight of 0.3% to 8%, magnesium chloride in a percentage by weight of 0.08% to 6.3%, potassium bicarbonate in a percentage by weight of 0.09% to 7.1%, malic acid in a percentage by weight of 0.01% to 12.9%, and the protein-based composition in a percentage by weight of 0.09% to 7.7%.

In yet another embodiment the preservative includes ascorbic acid in a percentage by weight of 65.9% to 86.8%, calcium ascorbate in a percentage by weight of 1.8% to 12.9%, carbohydrate in a percentage by weight of 1% to 12%, citric acid in a percentage by weight of 3% to 10%, calcium carbonate in a percentage by weight of 1.6% to 11.3%, sodium chloride in a percentage by weight of 0.5% to 4.6%, magnesium chloride in a percentage by weight of 0.1% to 5.3%, potassium bicarbonate in a percentage by weight of 0.5% to 4.6%, malic acid in a percentage by weight of 0.1% to 5.3%, and the protein-based composition in a percentage by weight of 0.8% to 4.6%.

In yet another embodiment the preservative includes ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0%, malic acid in a percentage by weight of approximately 0.6%, and the protein-based composition in a percentage by weight of approximately 0.50%.

The ascorbic acid a sugar acid and is provided for its antioxidant properties and because it is water-soluble. The ascorbic acid may also be in the form of one of its sodium, potassium or calcium salts. Also, the fat-soluble esters of ascorbic acid with long-chain fatty acids (ascorbyl palmitate or ascorbyl stearate) can be used.

The calcium ascorbate is the calcium salt of ascorbic acid, one of the mineral ascorbates. The sodium chloride, also known as salt, common salt, table salt, or halite, is an ionic compound and assists in both preserving the fresh fruit, through its hygroscopic properties, and enhancing the flavor of the food preservative mixture of the present invention. Essentially, the salt draws water out of bacteria through osmotic pressure preventing the bacteria from reproducing which will otherwise cause the food to spoil. While, more effective desiccants are available, few are safe for humans to ingest.

The maltodextrin is a polysaccharide produced from starch by partial hydrolysis. Maltodextrin is easily digestible, being absorbed as rapidly as glucose, and provides a sweetness to the food preservative mixture of the present invention.

The citric acid, such as from lemon or other citrus juice, can inhibit the action of the enzyme phenolase, which turns surfaces of cut apples and potatoes brown. Citric acid helps delay browning in fruits, but if over used can create a sour taste in the fruit and also allow the fruit to lose its crispness.

Calcium carbonate is used as an acidity regulator to maintain a desired pH of the composition of the present invention.

Sodium chloride, commonly known as table salt, while having a salty taste is used in the present invention as a preservative to maintain firmness and to enhance the flavor of the fruit by its salty taste.

Magnesium chloride is used as a coagulant to slightly thicken the resulting solution prepared according to the present invention to help the solution stick to the fresh produce being treated with the solution. The magnesium chloride and its various hydrates ($MgCl_2(H_2O)_x$), are salts that are typical ionic halides, being highly soluble in water.

Potassium bicarbonate (also known as potassium hydrogen carbonate or potassium acid carbonate), is a colorless, odorless, slightly basic, salty substance. Potassium bicarbonate is soluble in water, and is typically provided to enhance flavor. Tests set forth herein, however, indicate that the addition of potassium bicarbonate to the food preservative mixture has a particularly beneficial and unexpected effect on the shelf life of fresh cut fruit when combined with other ingredients set forth herein to help reduce oxidation and enhance texture and flavor.

Malic acid is an organic compound found mostly in unripe fruits and contributes to the sourness of green apples and has a sour or tart taste. The tests set forth herein, however, indicate that the addition of the malic acid to the food preservative mixture has a particularly beneficial and unexpected effect on the shelf life of the fruit when combined with other ingredients set forth herein.

Vitamin E is the generic term for tocopherols and tocotrienols. Vitamin E is a family of $\alpha$-, $\beta$-, $\gamma$-, and $\delta$- (respectively: alpha, beta, gamma, and delta) tocopherols and corresponding four tocotrienols. The vitamin E is in the food preservative mixture acts as a fat-soluble antioxidant that stops the production of reactive oxygen species formed when fat undergoes oxidation and prevents oils from going rancid and other damage to the food due to exposure to oxygen. The vitamin E blocks the formation of free radicals in the food fats by stabilizing their molecular structure The silicon dioxide, also known as silica functions as an anti-caking agent to prevent the ingredients of the food preservative according to the present invention from binding together.

The protein-based composition is provided in the form of a polysaccharide complex (PPC) composition comprised of a water-soluble polysaccharide, a substantially water-insoluble protein and an acid or acidulant. The polysaccharides are water-soluble, and are generally recognized as safe by the U.S. Food and Drug Administration. In general, the water-soluble polysaccharides are plant-derived polysaccharides and related materials such as pectin. Examples of polysaccharides that can be used to prepare the PPC compositions include, but are not limited to water-soluble cellulose derivatives, seaweed polysaccharides such as alginate and carrageenan, seed mucilaginous polysaccharides, complex plant exudate polysaccharides such as gum arabic, tragacanth, guar gum, pectin, ghatti and the like, and microbially synthesized polysaccharides such as xanthan gum. For example, the polysaccharide may be in the form of guar gum, pectin, gum arabic and mixtures thereof.

PPC composition is primarily comprised of the polysaccharide in an amount ranging between about 90% to 99.5% by weight of the total PPC composition. The total PPC composition is defined as the total weight of the protein and polysaccharide components.

The protein can be any protein that is predominately or substantially water-insoluble, however, vegetable proteins are advantageously utilized due to their availability. In general, the vegetable protein is a prolamine. A prolamine is a cereal-derived protein that is insoluble in water, absolute alcohol or neutral solvents and soluble in dilute (80%) alcohol. Suitable examples of prolamines include, but are not limited to, corn-derived prolamine or zein, barley-derived prolamine or hordein and wheat-derived prolamine or gliadin.

The substantially water-insoluble protein is present in an amount ranging between about 0.5% to 10% by weight of the total PPC composition. Ideally, the protein is provided in an amount ranging between about 1% to 5% by weight of the total PPC and is comprised of zein or corn gluten. Zein is extracted from corn or maize.

Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight. Of the eight amino acids that are necessary for protein synthesis in the human body, zein has virtually no lysine or tryptophan. Zein is extracted from corn gluten by physical separation means as opposed to chemical separation means. Whole corn zein contains a heterogeneous mixture of disulfide linked aggregates. Commercial extraction results in a product with a molecular weight of 25,000 to 35,000. Zein contains a high proportion of hydrocarbon group side chains and has a high percentage of amide groups present with a relatively low amount of free carboxylic acid groups.

The PPC typically has a relatively high pH, which is not necessarily advantageous for a food preservative according to the present invention. As such, food-grade pH adjusting compounds in the form of one or more acidulants, such as ascorbic acid, citric acid and malic acid, are used to maintain a desired pH of the food preserving solution of the present invention. An acid component of the solution to which the PPC is added enhances the water dispersibility of the PPC composition, thereby facilitating reconstitution of the protein-polysaccharide complex composition in water. The acid component is an organic acid, such as $C_1$ to $C_{20}$ organic acids. Suitable organic acids include, but are not limited to: citric acid, malic acid, ascorbic acid and the like and mixtures thereof, as well as salts thereof such as Na, K, and Ca salts. The acidulants employed in the production of the PPC compositions are used in an amount between about 0.25% to 5% by weight of the total PPC compositions during the preparation of the PPC composition.

A PPC composition can be prepared by dissolving the substantially water-insoluble protein or prolamine in an aqueous organic solvent system containing the acidulant to form a protein solution. The soluble polysaccharide is then added to the protein solution and the acidulant is added to form a protein-polysaccharide complex in solution. While the solvent can be separated or evaporated from the solution to yield the final, dry reconstitutable protein-polysaccharide complex (PPC) composition, but the complex may be maintained in solution.

It should be noted that the specifically recited compounds include related salts thereof where applicable, and the recitation of such compounds in the claims is intended to encompass such salts.

A method of preserving fresh cut fruit according to the principles of the present invention includes the steps of providing a solution of fruit preservative comprising water, ascorbic acid, calcium ascorbate, carbohydrate, citric acid, calcium carbonate, sodium chloride, magnesium chloride, potassium bicarbonate, malic acid and a protein-based composition such as a protein-polysaccharide complex, and applying the fresh fruit preservative solution to fresh cut fruit.

In one embodiment the method comprises providing ascorbic acid in a percentage by weight of 10% to 92.8%, calcium ascorbate in a percentage by weight of 01% to 67.7%, carbohydrate in a percentage by weight of 0.1% to 85%, citric acid in a percentage by weight of 0.05% to 12%, calcium carbonate in a percentage by weight of 0.05% to 55%, sodium chloride in a percentage by weight of 0.05% to 12%, magnesium chloride in a percentage by weight of 0.01% to 28.3%, potassium bicarbonate in a percentage by weight of 0.005% to 12%, malic acid in a percentage by weight of 0.001% to 22.3%, and a protein-based composition in a percentage by weight of 0.0005% to 12%.

In another embodiment the method comprises providing ascorbic acid in a percentage by weight of 55% to 92%, calcium ascorbate in a percentage by weight of 1% to 15%, carbohydrate in a percentage by weight of 1% to 62%, citric acid in a percentage by weight of 0.3% to 22.6%, calcium carbonate in a percentage by weight of 0.3% to 21.6%, sodium chloride in a percentage by weight of 0.3% to 8%, magnesium chloride in a percentage by weight of 0.08% to 6.3%, potassium bicarbonate in a percentage by weight of 0.09% to 7.1%, malic acid in a percentage by weight of 0.01% to 12.9%, and the protein-based composition in a percentage by weight of 0.09% to 7.7%.

In yet another embodiment the method comprises providing ascorbic acid in a percentage by weight of 65.9% to 86.8%, calcium ascorbate in a percentage by weight of 1.8% to 12.9%, carbohydrate in a percentage by weight of 1% to 12%, citric acid in a percentage by weight of 3% to 10%, calcium carbonate in a percentage by weight of 1.6% to 11.3%, sodium chloride in a percentage by weight of 0.5% to 4.6%, magnesium chloride in a percentage by weight of 0.1% to 5.3%, potassium bicarbonate in a percentage by weight of 0.5% to 4.6%, malic acid in a percentage by weight of 0.1% to 5.3%, and the protein-based composition in a percentage by weight of 0.8% to 4.6%.

In yet another embodiment the method comprises providing ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0%, malic acid in a percentage by weight of approximately 0.6%, and the protein-based composition in a percentage by weight of approximately 0.50%.

The fresh fruit, such as for example apples or pears, are rinsed to reduce or eliminate microorganisms on the surface of the fruit skin. The fruit is then processed, such as for example by paring, slicing, coring, dicing, peeling or a combination thereof, and then the fruit preservative is applied. The fruit preservative is applied by conventional techniques such as spraying, dipping, sprinkling tossing, immersing or drenching. Dipping involves immersing the fruit into a solution of fruit preservative. Good results have been obtained by dipping fruit about 1-2 minutes.

The fruit is can then be placed in package to prevent or reduce drying where the fruit is to be transported or sitting on a shelf. However, where the fruit is to be consumed with several hours from slicing or peeling the fruit is not packaged. To further reduce microbial growth, when consumption is not to occur for several hours or days, the fresh fruit should be stored in a refrigerator at a temperature of approximately 34 to 50 degrees Fahrenheit. While the fruit may be stored at ambient temperatures around 20 degrees C., shelf life is increased by storing below 20 degrees C. The fruit should also be stored above 0 degrees C. to prevent freezing.

The present invention provides a chemical mixture and resulting solution that increases the stability and shelf life of fresh cut fruit pieces. Once fruit is cut the exposed surfaces are exposed oxygen, the oxygen in the air causes oxidation or browning of the exposed cut surfaces. The present invention provides a chemical solution that counteracts the oxidation process and stabilizes the fruit preventing browning of the exposed cut surfaces. As a result of being preserved with fresh fruit preservative, the degradation of the color of the fruit is substantially reduced.

Several tests were conducted to determine the effectiveness of the preservative of the present invention on fresh cut apples. The tests were conducted by an independent testing laboratory. The cut pieces were subjected to various composition solutions according to the present invention and compared to untreated apple pieces. The tests were conducted over a period of at least three weeks. In a first trial, Gala apples were cut into wedge-shaped pieces, treated with various compositions and observed for a period of twenty-one days. The dry ingredients were mixed with luke warm water and vigorously mixed for 30 seconds and remixed as necessary to maintain the preservative ingredients in suspension. The pH of each solution used in the tests was at approximately 2.3. Each apple in unpeeled form was disinfected prior to cutting or treatment using a solution of 10 ppm chlorine (20 mL 5.25% chlorine bleach per liter of water for 30 seconds. The apples were pre-cooled, disinfected and then cored and cut into wedges. Wedges from two apples were then treated in the various solutions set forth in Table 1A and sealed in bags. The bags consisted of five layer textured film. The layers consisted of nylon film, a first adhesive layer, polyethylene, a second layer of adhesive and linear low-density Polyethylene.

The process included:

1. Dipping unpeeled apples into disinfecting solution for 30 seconds. Rinse off with clean water.
2. Coring and cutting the apples into wedges using a sharp knife.
3. Immediately dipping the apple wedges into treatment for 60 seconds and shaking off excess moisture.
4. Placing the treated apple wedges in poly bag, extracting 80-90% of air from the bag when the bag is sealed and refrigerating the treated apple wedges.
5. Storing the bagged apples in a refrigerated environment for a predetermined period of time.

After the predetermined period of time, the various apple samples were examined and scored. The scores ranged from 1 to 4 with a score of 1 representing a commercially salable condition with no discernable qualifications, a score of 2 representing a commercially salable condition, but with some minor qualifications, a score of 3 representing a non salable by being, for example, too gray, black, dehydrated, limp or containing other color defects, and a score of 4 representing an unacceptable and very poor non-salable condition.

In the following test results, reference herein to "Apple Fresh" refers to the preservative ingredients of the present invention minus the protein-based composition. Reference herein to "Icein" refers to the protein-based composition as described herein. Accordingly, as set forth in Table 1A below, apple slices were either untreated (to provide a first control), or treated with various preservatives and ratios thereof to provide comparison data in order to be able to determine the effectiveness of the various compositions on preserving fresh cut fruit. Table 1A of Test 1 sets forth the various compositions that were utilized in Test 1.

TABLE 1A

| Code | Reps | Description | mg Icein |
|---|---|---|---|
| UTC | 1 | Untreated Control | 0 |
| AF-300 | 1 | Apple Fresh Control @ 6% (60 grams per liter) FULL RATE | 0 |
| IC-300 | 1 | Icein Control (0.3 grams/liter) | 300 |
| IC-150 | 1 | Icein Control (0.15 grams/liter) | 150 |
| AF-150 | 1 | Apple Fresh + 0.5% Icein @ 6% (60 grams) Lot #1676 | 300 |
| AF-990 | 1 | Apple Fresh + 1.0% Icein @ 6% (60 grams) Lot #1676 | 600 |
| AF-435 | 1 | Apple Fresh + 2.0% Icein @ 6% (60 grams) Lot #1676 | 1200 |
| AF-600 | 1 | Apple Fresh @ 3% (30 grams per liter) HALF RATE | 0 |
| AF-500 | 1 | Apple Fresh @ 3% HALF RATE + 0.3 grams Icein | 300 |
| AF-925 | 1 | Apple Fresh @ 1.5% (15 grams per liter) QUARTER RATE | 0 |
| AF-750 | 1 | Apple Fresh @ 1.5% QUARTER RATE + 0.3 grams Icein | 300 |

The Apple Fresh included ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0% and malic acid in a percentage by weight of approximately 0.6%. The Icein comprised approximately 95% guar gum and 5% zein.

After twenty-one days, the various bags of apples were examined for freshness and discoloration. The results of Test 1 are set forth in Table 1B.

TABLE 1B

| | Score | Comments Day 21 |
|---|---|---|
| UTC | 3.5 | all surfaces light brown with darker brown edges |
| AF-300 | 1 | all surfaces white with zero browning |
| IC-300 | 2.5 | surfaces starting to brown but less than UTC |
| IC-150 | 2.7 | slightly more browning than IC-300 |
| AF-150 | 1 | all surfaces white with zero browning |
| AF-990 | 1 | all surfaces white with zero browning |
| AF-435 | 1 | all surfaces white with zero browning |
| AF-600 | 1.4 | surfaces generally white but some minor browning beginning to show |
| AF-500 | 1.1 | all surfaces white with a few small brown edges near core |
| AF-925 | 2 | visible browning showing on most surfaces but not mainly near edges |
| AF-750 | 1.1 | all surfaces white with a few small brown edges near core |

From the test results the following observations were also made. Neither the untreated control nor the Icein treatments alone adequately protected the color of the exposed apple surfaces. Apple Fresh @ 60 grams/liter water (6%) provided commercially acceptable apple slices at 21 days. Apple Fresh at 6% plus Icein at 0.5%, or 1.0% or 2.0% provided commercially acceptable control at 21 days equal to Apple Fresh alone at 6%. There was no benefit seen from Icein concentrations >0.5%. Apple Fresh alone at 30 g/L (half rate) provided commercially acceptable control at 21 days but was less effective than Apple Fresh alone at 6%. Apple Fresh alone at 15 g/L (half rate) provided barely commercially acceptable product at 21 days and was much less effective than Apple Fresh alone at 6%. The addition of 300 mg/L of Icein to the Apple Fresh treatments of 30 g/L or 15 g/L provided commercially acceptable control at 21 days that exceeded Apple Fresh alone at 30 g/L or 15 g/L but was slightly less effective than Apple Fresh alone at 6%.

Accordingly, Apple Fresh alone at the full rate of 60 g/L provides excellent preservation of color of apples slices for 21 days under a vacuum environment. Half and quarter rates of Apple Fresh alone did not perform as well as Apple Fresh at full rate. Used alone, Apple Fresh at less that full rate may not be robust enough to provide commercially acceptable control under all conditions. Apple Fresh at 60 g/L pre-formulated with 0.5% or 1.0% or 2.0 Icein performed equal to Apple Fresh alone at 60 g/L. There was no difference seen between formulae containing different rates of Icein. The addition of 300 mg/L of Icein to the quarter and half rates of Apple Fresh improved the performance of the treatment, with the improvement being more obvious with the quarter rate.

In a second test, Fuji and Pin Lady apples were tested in a similar manner to Test 1 and examined after twenty-one and twenty-eight days.

Table 2A of Test 2 sets forth the various compositions that were utilized in Test 2.

TABLE 2A

| Code | Reps | Description | mg Icein |
|---|---|---|---|
| UTC-FUJI | 1 | Untreated Control | 0 |
| UTC-PINK | 1 | Untreated Control | 0 |
| AF-FUJI | 1 | Apple Fresh Control @ 6% (60 grams per liter) FULL RATE | 0 |
| AF-PINK | 1 | Apple Fresh Control @ 6% (60 grams per liter) FULL RATE | 0 |
| ICEIN-FUJI | 1 | Icein Control (0.3 grams/liter) | 300 |
| ICEIN-PINK | 1 | Icein Control (0.3 grams/liter) | 300 |
| AS-FUJI | 1 | Apple Fresh + 0.5% Icein @ 6% (60 grams) Lot #1676 | 300 |
| AS-PINK | 1 | Apple Fresh + 0.5% Icein @ 6% (60 grams) Lot #1676 | 300 |
| AS1-FUJI | 1 | Apple Fresh + 0.5% Icein @ 6% (60 grams) Lot #1676 | 300 |
| A1S-PINK | 1 | Apple Fresh + 0.5% Icein @ 6% (60 grams) Lot #1676 | 300 |

Again, the Apple Fresh included ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0% and malic acid in a percentage by weight of approximately 0.6%. The Icein comprised approximately 95% guar gum and 5% zein.

After twenty-one and twenty-eight days, respectively, the various bags of apples were examined for freshness and discoloration. The results of Test 2 are set forth in Table 2B.

TABLE 2B

| Code | Day 21 | Comments Day 21 | Day 28 | Comments Day 28 |
|---|---|---|---|---|
| UTC-FUJI | 3 | All slices with some browning and with some very dark brown edges | 4 | All slices with some browning and with some very dark brown edges |
| UTC-PINK | 2.5 | All slices with some browning | 3.5 | All slices with some browning and with some very dark brown edges |
| AF-FUJI | 1.5 | Not as bright as other Fuji samples. Weak vacuum in bag. | 2 | Some browning beginning |
| AF-PINK | 1 | All surfaces bright - no browning | 1.2 | Generally clean with just a trace of browning beginning |
| ICEIN-FUJI | 2.5 | All slices with some browning | 2.6 | All slices with some browning - a bit darker near cores |
| ICEIN-PINK | 2 | All slices with some browning but not as severe as seen on Fuji | 2.5 | All slices with some browning - a bit darker near cores |
| AS-FUJI-1 | 1.2 | Not as bright as other Fuji samples but no browning | 1.2 | Brightest sample of all - no browning |
| AS-PINK-1 | 1 | All surfaces bright - no browning | 1.1 | A little excess water in bag. No browning |
| AS1-FUJI-2 | 1 | All surfaces bright - no browning | 1.3 | A little excess water in bag. No browning |
| AS1-PINK-2 | 1 | All surfaces bright - no browning | 1.1 | A little excess water in bag. No browning |

Based on the test results, the following conclusions were drawn. Apple Fresh alone provided commercial level anti-browning protection for 21 days but began to break at 28 days with variety Fuji. The untreated control failed to provide commercial level anti-browning protection for 21 days. Icein alone failed to provide commercial level anti-browning protection for 21 days. Apple Fresh with 0.5% Icein provided commercial level anti-browning protection for 28 days and showed less browning than Apple Fresh alone at both 21 days and 28 days. Apple Fresh with and without Icein provided better anti-browning protection of variety Pink Lady than of variety Fuji.

In a third test, Gala apples were tested in a similar manner to Test 1 and examined after twenty-one, twenty-five and twenty-eight days, respectively.

Table 3A of Test 3 sets forth the various compositions that were utilized in Test 2.

TABLE 3A

| Code | Reps | Description | mg Icein |
|---|---|---|---|
| UTC | 1 | Untreated Control | 0 |
| AF-300 | 1 | Apple Fresh Control @ 6% (60 grams per liter) FULL RATE | 0 |
| IC-300 | 1 | Icein Control (0.3 grams/liter) | 300 |
| IC-150 | 1 | Icein Control (0.15 grams/liter) | 150 |
| AF-150 | 1 | Apple Fresh + 0.5% Icein @ 6% (60 grams) Lot #1676 | 300 |
| AF-990 | 1 | Apple Fresh + 1.0% Icein @ 6% (60 grams) Lot #1676 | 600 |
| AF-435 | 1 | Apple Fresh + 2.0% Icein @ 6% (60 grams) Lot #1676 | 1200 |
| AF-600 | 1 | Apple Fresh @ 3% (30 grams per liter) HALF RATE | 0 |
| AF-500 | 1 | Apple Fresh @ 3% HALF RATE + 0.3 grams Icein | 300 |
| AF-925 | 1 | Apple Fresh @ 1.5%0 (15 grams per liter) QUARTER RATE | |
| AF-750 | 1 | Apple Fresh @ 1.5% QUARTER RATE + 0.3 grams Icein | 300 |

Again, the Apple Fresh included ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0% and malic acid in a percentage by weight of approximately 0.6%. The Icein comprised approximately 95% guar gum and 5% zein.

After twenty-one and then again at twenty-five and twenty-eight days after the vacuum seal of the bag was broken, respectively, the various bags of apples were examined for freshness and discoloration. The results of Test 3 are set forth in Table 3B.

TABLE 3B

|  | Day 21 with vacuum | Day 25, with vacuum broken | Day 28, | Comments at Day 28 |
|---|---|---|---|---|
| UTC | 3.5 | 4 | 4 | all surfaces light brown with darker brown edges |
| AF-300 | 1 | 1 | 1.2 | all surfaces white with zero browning; just a touch of dehydration; firm texture; nice apple-like smell; good apple taste |
| IC-300 | 2.5 | 2.7 | 2.7 | all surfaces starting to brown but less than UTC. More browning near cores; firm texture; nice apple-like smell; good apple taste |
| IC-150 | 2.7 | 3 | 3 | slightly more browning than IC-300; some dehydration obvious; firm texture; nice apple-like smell; good apple taste |
| AF-150 | 1 | 1.5 | 1.5 | Some very minor browning near core area of some slices. Generally not as bright as the full rate; firm texture; nice apple-like smell; good apple taste |
| AF-990 | 1 | 1.5 | 1.5 | generally lack of brightness and some very minor browning at core area of a few slices; surface bruises browning; firm texture; nice apple-like smell; good apple taste |
| AF-435 | 1 | 1.2 | 1.2 | all surfaces white with zero browning. Not quite as bright as the full rate Apple Fresh; firm texture; nice apple-like smell; good apple taste |
| AF-600 | 1.4 | 2 | 2.5 | surfaces generally white but not bright and some browning especially near cores; firm texture; nice apple-like smell; good apple taste |
| AF-500 | 1.1 | 1.1 | 1.3 | all surfaces white with minor browning near core; firm texture; nice apple-like smell; good apple taste |
| AF-925 | 2 | 2 | 2.5 | visible browning showing on most surfaces but especially near core areas; firm texture; nice apple-like smell; fair apple taste |
| AF-750 | 1.1 | 1.1 | 1.4 | all surfaces white with minor browning near core on a few slices; firm texture; nice apple-like smell; good apple taste |

Based on the test results, the following conclusions were drawn. Apple Fresh alone at 60 g/L (full rate) was efficacious at protecting the color and texture of the apple slices for 21 days in a vacuum bag and for an additional 7 days when the vacuum seal was compromised. Apple Fresh alone at 30 g/L (half rate) was efficacious at protecting the color and texture of the apple slices for 21 days in a vacuum bag but was not efficacious for an additional 7 days when the vacuum seal was compromised. Apple Fresh alone at 15 g/L (quarter rate) was not efficacious at protecting the color and texture of the apple slices for 21 days in a vacuum bag and was not efficacious for an additional 7 days when the vacuum seal was compromised. Icein alone at 300 mg/L or 150 mg/L was not efficacious at protecting the color and texture of the apple slices for 21 days in a vacuum bag and was not efficacious for an additional 7 days when the vacuum seal was compromised. Apple Fresh at 60 g/L (full rate) pre-formulated with 0.5% or 1.0% or 2.0% Icein was efficacious at protecting the color and texture of the apple slices for 21 days in a vacuum bag and for an additional 7 days when the vacuum seal was compromised. Apple Fresh at 30 g/L (half rate)+300 mg/L Icein was efficacious at protecting the color and texture of the apple slices for 21 days in a vacuum bag and for an additional 7 days when the vacuum seal was compromised. Apple Fresh at 15 g/L (quarter rate)+300 mg/L Icein was efficacious at protecting the color and texture of the apple slices for 21 days in a vacuum bag and for an additional 7 days when the vacuum seal was compromised. All apples, except UTC were firm, had a typical apple-like small and a typical apple-like taste at Day 28. Based on these observations, the following conclusions were drawn. Icein at 300 mg/L can improve the effectiveness of Apple Fresh when the rate of Apple Fresh is reduced. Icein at 300 mg/L can improve the effectiveness of Apple Fresh when the vacuum in the bag is compromised.

Based on the foregoing test results, it is evident that the addition of Icein to Apple Fresh produces unexpected results by extending the effectiveness of Apple Fresh over a longer period of time to fresh cut apples when the Apple Fresh was used at a rate of less than 60 grams per liter. It can be further drawn from the foregoing test data that the addition of Icein to Apple Fresh when Apple Fresh is utilized at less than 60 grams per liter rate will extend the effectiveness of the Apple Fresh to maintain freshness of fresh cut apple slices beyond to at least 28 days.

It would be apparent to those skilled in the art that some other ingredients may be added to the composition of the present invention, including equivalent compounds and substances without departing from the spirit and scope of the present invention. Thus, while there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or substances similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the composition of the invention to achieve those advantages including combinations of ingredients of the various embodiments. Hence, reference herein to specific details of the compositions and function of the present invention is by way of example only and not by way of limitation.

What is claimed is:

1. A method for preserving fresh cut fruit, comprising:
providing a fresh fruit preservative solution comprising:
water;
ascorbic acid in a percentage by weight of 10% to 92.8%;
calcium ascorbate in a percentage by weight of 0.01% to 67.7%;
carbohydrate in a percentage by weight of 0.1% to 85%;
citric acid in a percentage by weight of 0.05% to 12%;
calcium carbonate in a percentage by weight of 0.05% to 55%;
sodium chloride in a percentage by weight of 0.05% to 12%;
magnesium chloride in a percentage by weight of 0.01% to 28.3%;
potassium bicarbonate in a percentage by weight of 0.005% to 12%;
malic acid in a percentage by weight of 0.001% to 22.3%; and
a protein-based composition in a percentage by weight of 0.0005% to 12%; and
applying the fresh fruit preservative solution to fresh cut fruit.

2. The method of claim 1, further comprising providing the ascorbic acid ascorbic acid in a percentage by weight of 55% to 92%, calcium ascorbate in a percentage by weight of 1% to 15%, carbohydrate in a percentage by weight of 1% to 62%, citric acid in a percentage by weight of 0.3% to 22.6%, calcium carbonate in a percentage by weight of 0.3% to 21.6%, sodium chloride in a percentage by weight of 0.3% to 8%, magnesium chloride in a percentage by weight of 0.08% to 6.3%, potassium bicarbonate in a percentage by weight of 0.09% to 7.1%, malic acid in a percentage by weight of 0.01% to 12.9%, and the protein-based composition in a percentage by weight of 0.09% to 7.7%.

3. The method of claim 1, further comprising providing the ascorbic acid ascorbic acid in a percentage by weight of 65.9% to 86.8%, calcium ascorbate in a percentage by weight of 1.8% to 12.9%, carbohydrate in a percentage by weight of 1% to 12%, citric acid in a percentage by weight of 3% to 10%, calcium carbonate in a percentage by weight of 1.6% to 11.3%, sodium chloride in a percentage by weight of 0.5% to 4.6%, magnesium chloride in a percentage by weight of 0.1% to 5.3%, potassium bicarbonate in a percentage by weight of 0.5% to 4.6%, malic acid in a percentage by weight of 0.1% to 5.3%, and the protein-based composition in a percentage by weight of 0.8% to 4.6%.

4. The method of claim 1, further comprising providing the ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0%, malic acid in a percentage by weight of approximately 0.6%, and the protein-based composition in a percentage by weight of approximately 0.50%.

5. The method of claim 1, further comprising providing calcium chloride to the fresh fruit preservative solution.

6. The method of claim 5, further comprising providing the calcium chloride in a percentage by weight of 0.01% to 15%.

7. The method of claim 6, further comprising providing the calcium chloride in a percentage by weight of 0.2% to 3%.

8. The method of claim 1, further comprising wherein the carbohydrate is provided in the form of maltodextrin.

9. The method of claim 1, further comprising providing vitamin E to the fresh fruit preservative solution.

10. The method of claim 9, further comprising providing the vitamin E in a percentage by weight of approximately 0.00066%.

11. The method of claim 1, further comprising providing silicon dioxide to the fresh fruit preservative solution.

12. The method of claim 1, further comprising providing the protein-based composition as a protein-polysaccharide complex.

13. The method of claim 1, further comprising providing the protein-based composition as a composition of approximately 8% zein protein, 90% guar gum and 2% citric acid.

14. A preservative for fresh cut fruit, comprising:
ascorbic acid in a percentage by weight of 10% to 92.8%;
calcium ascorbate in a percentage by weight of 01% to 67.7%;
carbohydrate in a percentage by weight of 0.1% to 85%;
citric acid in a percentage by weight of 0.05% to 12%;
calcium carbonate in a percentage by weight of 0.05% to 55%;
sodium chloride in a percentage by weight of 0.05% to 12%;
magnesium chloride in a percentage by weight of 0.01% to 28.3%;
potassium bicarbonate in a percentage by weight of 0.005% to 12%;
malic acid in a percentage by weight of 0.001% to 22.3%; and
a protein-based composition in a percentage by weight of 0.0005% to 12%.

15. The preservative of claim 14, further comprising ascorbic acid ascorbic acid in a percentage by weight of 55% to 92%, calcium ascorbate in a percentage by weight of 1% to 15%, carbohydrate in a percentage by weight of 1% to 62%, citric acid in a percentage by weight of 0.3% to 22.6%, calcium carbonate in a percentage by weight of 0.3% to 21.6%, sodium chloride in a percentage by weight of 0.3% to 8%, magnesium chloride in a percentage by weight of 0.08% to 6.3%, potassium bicarbonate in a percentage by weight of 0.09% to 7.1%, malic acid in a percentage by weight of 0.01% to 12.9%, and the protein-based composition in a percentage by weight of 0.09% to 7.7%.

16. The preservative of claim 14, further comprising ascorbic acid ascorbic acid in a percentage by weight of 65.9% to 86.8%, calcium ascorbate in a percentage by weight of 1.8% to 12.9%, carbohydrate in a percentage by weight of 1% to 12%, citric acid in a percentage by weight of 3% to 10%, calcium carbonate in a percentage by weight of 1.6% to 11.3%, sodium chloride in a percentage by weight of 0.5% to 4.6%, magnesium chloride in a percentage by weight of 0.1% to 5.3%, potassium bicarbonate in a percentage by weight of 0.5% to 4.6%, malic acid in a percentage by weight of 0.1% to 5.3%, and the protein-based composition in a percentage by weight of 0.8% to 4.6%.

17. The preservative of claim 14, further comprising ascorbic acid in a percentage by weight of approximately 76.5%, calcium ascorbate in a percentage by weight of approximately 4.0%, carbohydrate in a percentage by weight of approximately 3.0%, citric acid in a percentage by weight of approximately 6.0%, calcium carbonate in a percentage by weight of approximately 6.8%, sodium chloride in a percentage by weight of approximately 0.8%, magnesium chloride in a percentage by weight of approximately 0.8%, potassium bicarbonate in a percentage by weight of approximately 1.0%, malic acid in a percentage by weight of approximately 0.6%, and the protein-based composition in a percentage by weight of approximately 0.50%.

18. The preservative of claim 14, further comprising calcium chloride.

19. The preservative of claim 18, further comprising calcium chloride in a percentage by weight of 0.01% to 15%.

20. The preservative of claim 19, further comprising calcium chloride in a percentage by weight of 0.2% to 3%.

21. The preservative of claim 14, further comprising the carbohydrate in the form of maltodextrin.

22. The preservative of claim 14, further comprising vitamin E.

23. The preservative of claim 22, further comprising the vitamin E in a percentage by weight of approximately 0.00066%.

24. The preservative of claim 14, further comprising silicon dioxide.

25. The preservative of claim 14, wherein the protein-based composition is a protein-polysaccharide complex.

26. The preservative of claim 14, further wherein the protein-based composition is a composition of zein protein, guar gum and citric acid.

27. The preservative of claim 26, wherein the protein-based composition is comprised of approximately 90% guar gum, approximately 8% zein protein and approximately 2% citric acid.

* * * * *